United States Patent [19]

Peiffer

[11] Patent Number: 5,071,934

[45] Date of Patent: Dec. 10, 1991

[54] CATIONIC HYDROPHOBIC MONOMERS AND POLYMERS

[75] Inventor: Dennis G. Peiffer, East Brunswick, N.J.

[73] Assignee: Exxon Research and Engineering Company, Florham Park, N.J.

[21] Appl. No.: 376,273

[22] Filed: Jul. 3, 1989

Related U.S. Application Data

[63] Continuation-in-part of Ser. No. 135,827, Dec. 21, 1987, abandoned.

[51] Int. Cl.$^5$ .............................................. C08F 20/60
[52] U.S. Cl. .................................. 526/307; 526/303.1; 526/307.2
[58] Field of Search .............................. 526/307, 307.2

[56] References Cited

U.S. PATENT DOCUMENTS

| | | | |
|---|---|---|---|
| 4,172,066 | 10/1979 | Zweigle et al. | 526/306 |
| 4,395,524 | 7/1983 | Emmons et al. | 526/307.2 |
| 4,417,992 | 11/1983 | Bhattacharyya et al. | 526/307.2 |
| 4,673,716 | 6/1987 | Siano et al. | 526/307.2 |
| 4,694,046 | 9/1987 | Bock et al. | 526/307.2 |
| 4,694,058 | 9/1987 | Siano et al. | 526/307.2 |

*Primary Examiner*—Joseph L. Schofer
*Assistant Examiner*—J. M. Reddick
*Attorney, Agent, or Firm*—Richard E. Nanfeldt; Joseph J. Dvorak

[57] ABSTRACT

A novel family of cationic monomers and copolymers containing an alkyl moiety of variable carbon length can be prepared. The cationic-type copolymers are formed through conventional synthesis techniques and the solutions formed with these materials possess rheological properties markedly different than conventional cationic polyelectrolytes.

6 Claims, 3 Drawing Sheets

CATIONIC HYDROPHOBIC MONOMERS AND POLYMERS

This is a continuation-in part of U.S. Ser. No. 135,827, filed Dec. 21, 1987 now abandoned.

BACKGROUND OF THE INVENTION

It is well known that polymeric materials are generally considered useful as viscosification agents when dissolved in an appropriate solvent system. The major reason for this viscosity enhancement is due to the very large dimensions of the individual polymer chain as compared to the dimension of the single solvent molecules. Any increase in the size of the polymer chain will produce a corresponding enhancement in the viscosity of the solution. This effect is maximized when the polymer is dissolved in a "good" solvent. Therefore, in general, a soluble polymer is useful for thickening solvents, while a water soluble polymer is appropriate for increasing the viscosity of aqueous systems. With regard to aqueous solutions, soluble nonionic polymers and high charge density sulfonated or carboxylate polyelectrolytes are quite useful in this regard and are commonly used materials. However, the solution properties of the former family of materials are controlled primarily through modification of the molecular weight of the polymer and through changes in the level of dissolved polymer. These materials become especially effective at concentrations where the individual polymer chains begin to overlap. This "transition" is commonly referred to in the literature as the chain overlap concentration or simply $C^*$. It should be noted that in most nonionic polymers of commercial interest, a relatively large amount of polymer is required prior to reaching $C^*$. Therefore, this approach is undesirable from an economic viewpoint. Moreover, the rheological properties of many of these nonionic systems have been published. The results of these studies show that, in general, these solutions are shear thinning over all shear rates investigated.

Polyelectrolytes, on the other hand, are very useful and the most commonly used materials. However, the solution properties of these materials begin to deteriorate as low molecular additives (i.e., acids, bases or salts) are dissolved in the solution. These additives screen the charges that are fixed along the chain backbone which results in a decrease in the dimensions of the polymer molecule. The viscosity diminishes as long as the chain continue to shrink.

It has been found previously (U.S. Pat. Nos. 4,460,758 and 4,540,496), for example, that intrapolymer complexes, composed of a nonstoichometric ratio of cationic and anionic monomeric units, can be useful in viscosifying aqueous solutions systems (as required in a variety of well control and workover fluids; i.e., water based drilling fluids and acid gelation systems). More importantly, these polymeric materials possess higher viscosity in acid, base or salt solution than in the corresponding fresh water system. Even more interesting is the observation that these polymeric materials show a corresponding viscosity enhancement as the concentration of the dissolved acid, base or salt is increased, even though the polyampholyte contains a substantial amount of dissociable charge. As explained earlier, these viscosity results are unexpected since the general tendency of charged macromolecules in these types of aqueous solutions shows a marked decrease in thickening efficiency.

Furthermore, in recent years, interpolymer complexes have received considerable attention in the literature due to their interesting and unique properties. In most instances, these complexes are formed by intimately mixing aqueous solutions containing high-charge density polyelectrolytes possessing opposite charge. When these polymer molecules meet in solution, the interaction between oppositely charged sites will cause the release of their associated counterions forming the complex. The counterions are now free to diffuse into the bulk solution. Normally, phase separation occurs upon prolonged standing in these high-charged density complexes. As a result, these materials have poor viscosification properties. In previous U.S. patents it is reported that low-charge interpolymer complexes are soluble and effective in viscosifying aqueous solution systems. More importantly, these complexes possess a substantially higher viscosity than the corresponding individual low-charge density copolymer components. As detailed earlier, these characteristics are unexpected since high-charge density complexes are insoluble in these conventional solution systems.

Even more interesting is the unique and unexpected result that these soluble interpolymer complexes are capable of enhancing the viscosity of aqueous solutions under relatively broad shear conditions. With these unique polymeric materials, dilatant behavior occurs in aqueous fluids which are of extreme technological utility. It is further noted that under the identical experimental conditions, the viscosity of the individual co-polymer components show the normal shear thinning behavior.

This invention teaches that a novel family of cationic copolymers containing a unique family of cationic-alkyl containing amidoalkyl quaternary ammonium salts monomer moieties are useful in viscosifying fresh water and even high brine environments and, more importantly, these polymeric materials have improved and different solution properties as compared to conventional polyelectrolytes and nonionic polymers. These polymers are synthesized via conventional synthetic techniques without the use of surfactants, for example. These cationic-alkyl containing monomers are inherently water soluble.

These copolymers are based on, but not limited to, the incorporation of the above cationic monomers into an acrylamide backbone structure.

It is well known that polyacrylamide and hydrolyzed polyacrylamide are water soluble polymers that have been previously disclosed in the literature and have found application in the viscosification of aqueous solutions. This is achieved through a combination of high molecular weight and chain expansion due to repulsion of pendant ionic groups along the polymer chain. However, high molecular weight polymers present well known difficulties in manufacture and subsequent processing because of their irreversible degradation when exposed to conditions of high shear such as would be obtained in the usual stirring devices. Moreover, the presence of pendant ionic groups leads to solution properties which are markedly influenced by the presence of dissolved cations. In particular, the viscosity of solutions of these polymers usually decreases strongly upon increasing concentrations of brine.

This invention teaches an alternative means for providing polymers which viscosify water or brine at low concentrations. This method relies on the incorporation of a small amount of hydrophobic groups into a polymer with a water soluble backbone. These hydrophobic groups tend to associate with one another in an aqueous solution, and when the association occurs intermolecularly, the solution viscosity may be increased relative to the polymer without the hydrophobic side groups. An additional benefit is that the solution viscosity is relatively insensitive to salts because the hydrophobic groups are not ionic.

The synthesis of copolymers composed of water soluble and water insoluble monomers presents difficulties. In order for polymerization to be effected, the monomers must obviously come into close proximity to one another. A variety of processes based upon prior art could conceivably achieve this, but have serious deficiencies, necessitating the instant invention. For example, simply dispersing the water insoluble monomer as fine particles in the aqueous medium, while dissolving the water soluble monomer in water would result in poor incorporation of the water insoluble monomer and would lead to a heterogeneous product of particles dispersed in the predominantly water soluble polymer. This would therefore require the extra step of separating the unreacted monomer particulates from the reaction product.

Conventional emulsion polymerization, which uses a surfactant to disperse the water insoluble monomer into the aqueous medium containing the dissolved water soluble monomer, has other disadvantages. In this process, the bulk of the water insoluble monomer is contained initially in droplets which are at least one micron in diameter. These droplets must be stabilized against coalescence by a combination of agitation and added surfactant. The product copolymer is usually in the form of particulates with diameters on the order of 500 to 2000 Å in diameter.

Alternatively, both monomers may be dissolved in a solvent or solvent mixture having properties intermediate between water and a hydrocarbon solvent. Although this undoubtedly allows the comonomers to come into close proximity to one another, since the dispersion is on a molecular scale, this process presents other difficulties. For example, often the copolymer is insoluble in the mixed solvent which is capable of solubilizing the monomers. This leads to precipitation of the copolymer when it has a molecular weight which is still too low to produce efficient viscosification. The reaction product is usually heterogeneous which therefore requires a disadvantageous additional processing step. Furthermore, the water miscible solvents such as alcohols, acetone, ethers and acetic acid are fairly good chain transfer agents and when used in reasonable quantities would lead to decreased molecular weights and hence poor viscosification efficiency.

It should be noted in this regard that the use of hydrophobic groups on water soluble polymers to enhance the rheological properties of water based fluids has been described. One approach to provide polyacrylamide based systems containing hydrophobic groups is described by Bock, et al., U.S. Pat. Nos. 4,520,182 and 4,528,348. Water soluble acrylamide copolymers containing a small amount of oil soluble or hydrophobic alkylacrylamide groups were found to impart efficient viscosification to aqueous fluids. Landoll, U.S. Pat. No. 4,304,902, describes copolymers of ethylene oxide with long chain epoxides which also required relatively large polymer concentration (approximately 1%) for thickening water and required surfactant for solubility due to irregularities in the polymerization. In a related case, U.S. Pat. No. 4,428,277, modified nonionic cellulose ether polymers are described. Although these polymers show enhanced viscosification relative to polymers not containing hydrophobic groups, the viscosification efficiency was very low, requiring 2 to 3 weight percent polymer to provide an enhancement. The use of surfactants to enable solubility and, in turn, viscosification, by a water soluble polymer containing hydrophobic groups is described by Evani, U.S. Pat. No. 4,432,881. The hydrophobic groups claimed are attached to the polymer via an acrylate linkage which is known to have poor hydrolytic stability. In addition, the need for a surfactant to achieve solubility and thickening efficiency should made such a system very salt sensitive, as well as very sensitive to small changes in surfactant and polymer concentrations. Emmons, et al., U.S. Pat. No. 4,395,524, teaches acrylamide copolymers as thickeners for aqueous systems. While these polymers possess hydrophobic groups they are prepared using alcohol containing solvent which are known chain transfer agents. The resulting polymers have rather low molecular weights and, thus, relatively high polymer concentrations are required to achieve reasonable viscosification of water based fluids.

SUMMARY OF THE INVENTION

A process for producing copolymers of water soluble monomers with water soluble hydrophobic monomers yields efficient viscosifiers of aqueous media. The process relies on the complete solubilization of the water soluble hydrophobic monomers by means of a cationic charge chemically bound to the alkyl-containing monomer. As a result, the hydrophobic monomer is completely capable of producing a clear, uniform homogeneous mixture in the presence of the other well-known water soluble monomers and which remains clear, uniform and a homogeneous mixture with no phase separation as the polymerization reaction proceeds toward completion. The cationic-type monomers may inherently form micelles which are minute aggregates, consisting of on the order of 50-200 individual monomer entities. This is accomplished without the need of any other surfactant as in micellar and microemulsion type polymerizations. The former micelles are stable toward phase separation and are effectively dispersed on a very fine scale so that the copolymerization is effected without the formation of latexes or fine particulates.

The copolymers which may be isolated from the reaction mixture, form aqueous solutions which are very efficient viscosifiers of water or brine, having molecular weights such that their intrinsic viscosities are greater than about 1 dl/g, but not so high that they are extremely susceptible to shear degradation.

DETAILED DESCRIPTION OF THE INVENTION

Figure 1:
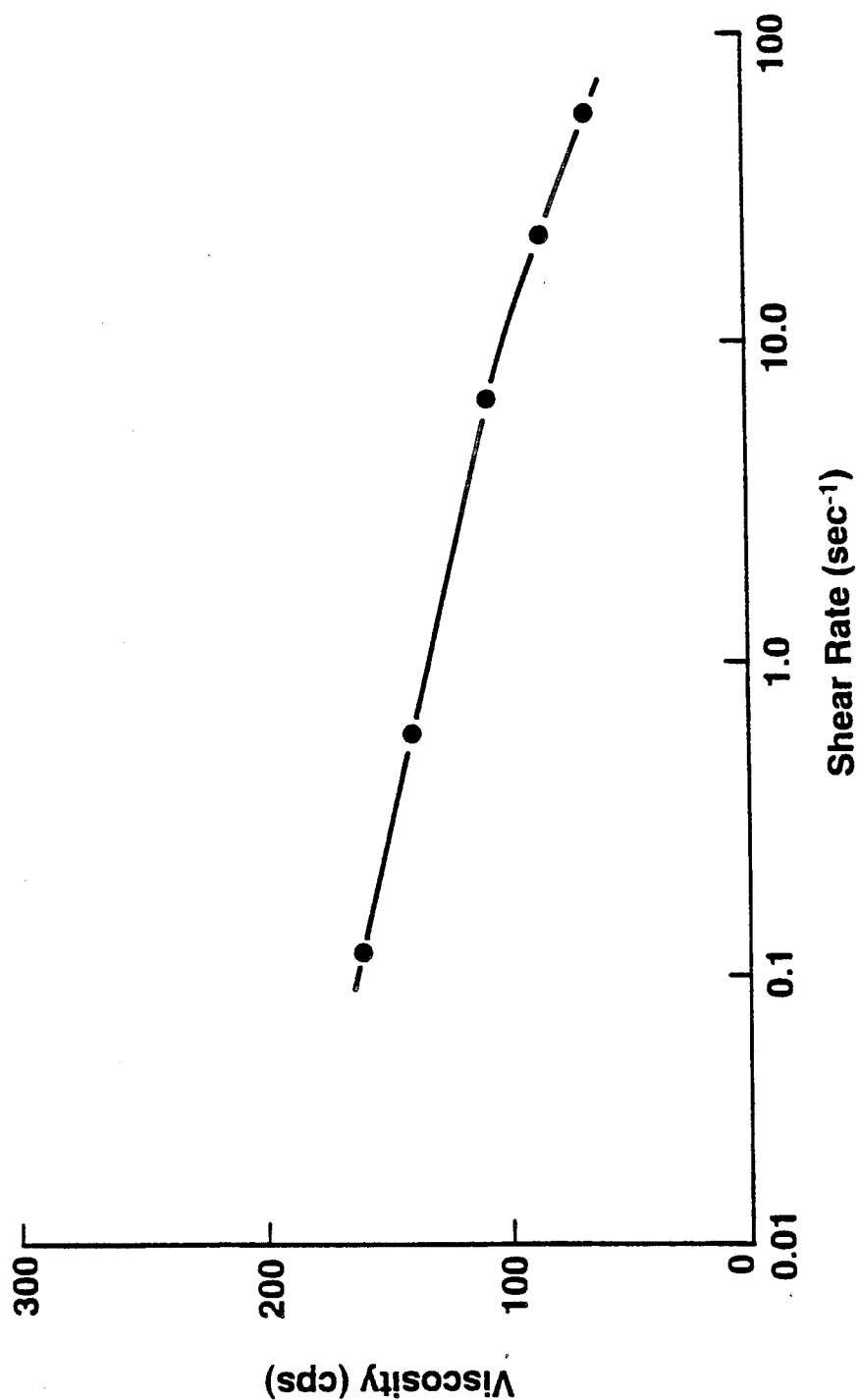

The process of this invention overcomes the difficulties experienced in conventional polymerizations. In particular, it enables the copolymerization of the water soluble monomer, acrylamide, and water soluble monomers such as an dimethylaminopropyl methacrylamide derivatives using alkyl halides to give copolymers which are efficient aqueous viscosifiers.

The process relies on the solubility of these alkyl derivatives into a predominantly aqueous media. These cationic derivates inherently form micelles without the utilization of any other surfactant. The reaction mixture is isotropic, clear, and homogeneous.

These micellar reaction mixtures are free of visible oil droplets or particulates of the water insoluble monomer. The polymerization can therefore be initiated by water soluble initiators to give co-polymers that are substantially free of visible particulates. The resultant reaction product remains homogeneous throughout the course of the reaction.

Micelles formed by the cationic hydrophobic monomers, which are water soluble, are generally very small aggregates which consist of on the order of 50 to 200 molecules. They form spontaneously upon mixing the components together, i.e., they do not require the vigorous mixing conditions required in conventional emulsion polymerization in which macroemulsions are formed. The macroemulsion droplets of the conventional emulsion polymerization process have diameters which are at least 10,000 Å. They therefore tend to phase separate upon standing, leading to undesirable inhomogeneities in the produced copolymer. The homogeneous geneous micellar reaction mixture is, on the other hand, much more stable against demixing than the formulations used in emulsion polymerization processes. Indeed, no stirring is required during the course of the micellar copolymerization--the micellar aggregates remain extremely finely dispersed throughout. Moreover over, the extremely dispersed nature of the micellar aggregate permits the copolymerization to occur in such a way that a water soluble copolymer is produced which does not contain particulates or latexes of water insoluble polymers. These would be detrimental in such applications as secondary oil recovery, which requires a product which is substantially free of pore plugging particulates.

An additional important feature is that the resultant copolymer possess both a cationic charge and a hydrophobic unit on the polymer chain without the necessity of further chemical post-treatment. Besides the ease of polymerization to form these hydrophobically associating polymers, the cationic and alkyl group, i.e., hydrophobic entity, gives one a great degree of control of the final polymer structure and of course, physical properties.

Surfactants, although unnecessary as described above, can still be used. The surfactants which may be used in this process may be one of the water soluble surfactants such as salts of alkyl sulfates, sulfonates, carboxylates and the like, or nonionic such as ethylene oxide-propylene oxides copolymers, or polyoxyethylene alkyl ethers, etc. or cationic surfactants such as primary alkylamines, dialkyl secondary amines, or ethoxylated fatty amines. Suitable surfactants may be chosen from these on the basis of water solubility and solubilization capacity for any other water insoluble monomers intentionally added to the polymerization mixture.

Suitable free radical initiators for the copolymerization process are peroxides such as hydrogen peroxide sodium thiosulfate, benzoylperoxide, potassium persulfate, alkyl peroxides and the like. The concentration of the free radical initiator is about 0.01 to about 0.50 grams per hundred grams of acrylamide and cationic alkyl-containing monomer. The polymerization is conducted in the absence of oxygen at a temperature of about 20° to about 100° C. The polymer may be recovered from the reaction mixture by precipitation by nonsolvents such as acetone.

The water soluble copolymers which are produced by the copolymerization process of the instant invention are characterized by the formula:

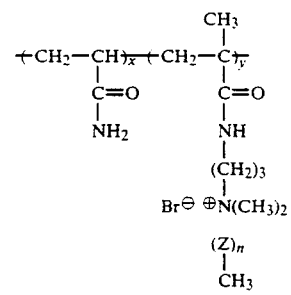

wherein n is preferably 6 to 22 and Z is a straight chained or branched alkyl or cycloalkyl group, more preferably 6 to 20 and most preferably 6 to 18.

Typical, but non-limiting examples of preferred alkyl groups are hexyl, octyl, decyl, dodecyl, hexadecyl and steryl groups. X is preferably about 90 to 99.9 mole %, more preferably about 95 to about 99.8 mole %, and most preferably about 97 to about 99.5 mole %. These water soluble copolymers are of a sufficiently high moleculr weight that they are efficient viscosifiers of water or brine, but not so high that they are readily susceptible to irreversible shear degradation. That is, their intrinsic viscosity in water is greater than about 1 dl/g and less than about 10 dl/g.

DESCRIPTION OF THE PREFERRED EMBODIMENT

The following examples explain the invention, which are by way of illustration, but not of limitation.

EXAMPLE 1

Synthesis of Cationic-Hydrophobic Monomer

A representative example for the synthesis of the following monomer structures which is subsequently copolymerized to form a lightly cationic alkyl-containing water soluble copolymer is described below:

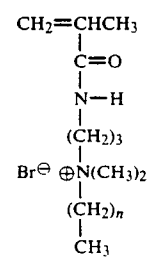

In this representative example n=11.

Into a small round bottom flask add 70 mls of acetone and the following materials:
20 g of dimethylaminopropyl methacrylamide
29.3 g of dodecylbromide Gently heat to 35° C. with agitation for approximately 20 hours.

Subsequently, an excess of anhydrous diethyl ether is added to the acetone solution and immediately a precipitate forms. This material is filtered and washed repeatedly with a large excess of the anhydrous diethyl ether.

Elemental, infrared and NMR analysis confirms that the monomer is very pure (>99%) and has, in this specific example, the following molecular structure:

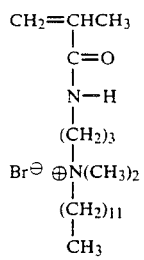

This monomer is completely water soluble to high concentrations producing aqueous solutions with remarkably low surface tensions.

EXAMPLE 2

Copolymer Synthesis

A representative example for the synthesis of an acrylamide copolymer containing the above described monomer (n=11) is described below.

Into a 1 liter-4 neck round bottom flask add:
500 mls distilled water
47.0 g acrylamide (99 mole %)
2.6 g cationic (n=11) monomer (1 mole %)
0.1 lg Vazo 33 (DuPont® Product)* *Vazo 33 is 2,2′ azobis (2,4-dimethyl-4-methoxyvaleronitrile)

The solution is purged with argon gas for approximately two hours at room temperature and subsequently the low temperature initiator is dissolved into the monomer solution. After 24 hours, the copolymer is precipitated from solution with a large excess of acetone. Subsequently, the copolymer is washed several times with a large excess of acetone and dried in a vacuum oven at 60° C. for 24 hours. Elemental analysis, i.e. bromine content, showed that the copolymer contained 0.68 mole % (0.74 weight % bromine) of the cationic alkyl containing monomer units.

EXAMPLE 3

Rheology

Figure 2:
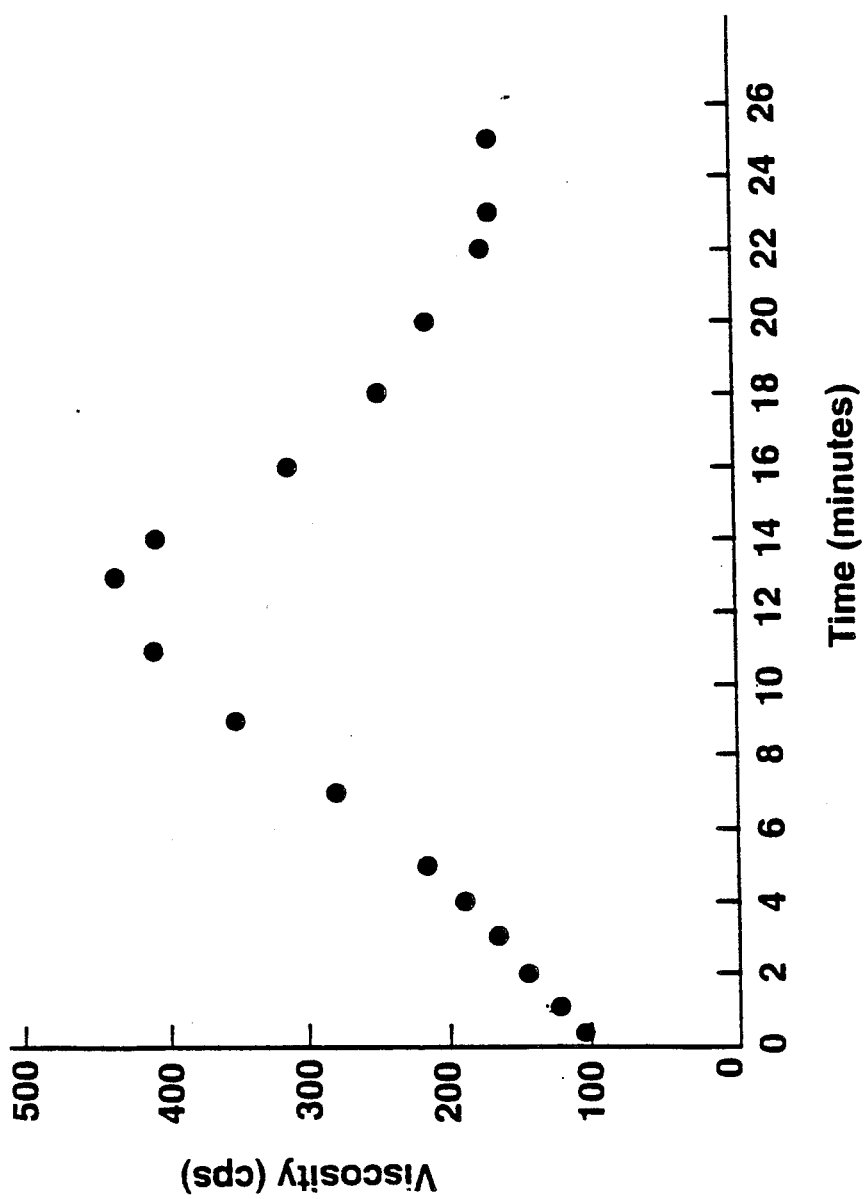

FIG. 1 shows that viscosity-shear rate data of the previously described copolymer synthesized with the low temperature initiator (Vazo 33). At the shear rate shown in FIG. 1, no shear thickening nor time dependence was observed. Even though the viscosity of the solution is excellent for a variety of applications, shear thinning occurs at shear rates greater than approximately 1 sec$^{-1}$. However, it is interesting to note that very dramatic time dependencies are observed at shear rates less than about 1 sec$^{-1}$ (FIG. 2). In fact, as the data confirms the viscosity rose about 5 times over a period of approximately 12 minutes. Subsequently, the viscosity slowly falls to about 2 times the original viscosity. This is a rather rare phenomena, but the observation gives a one degree of control over the rheological properties of an aqueous fluid not attainable with conventional water soluble polymers.

Figure 3:
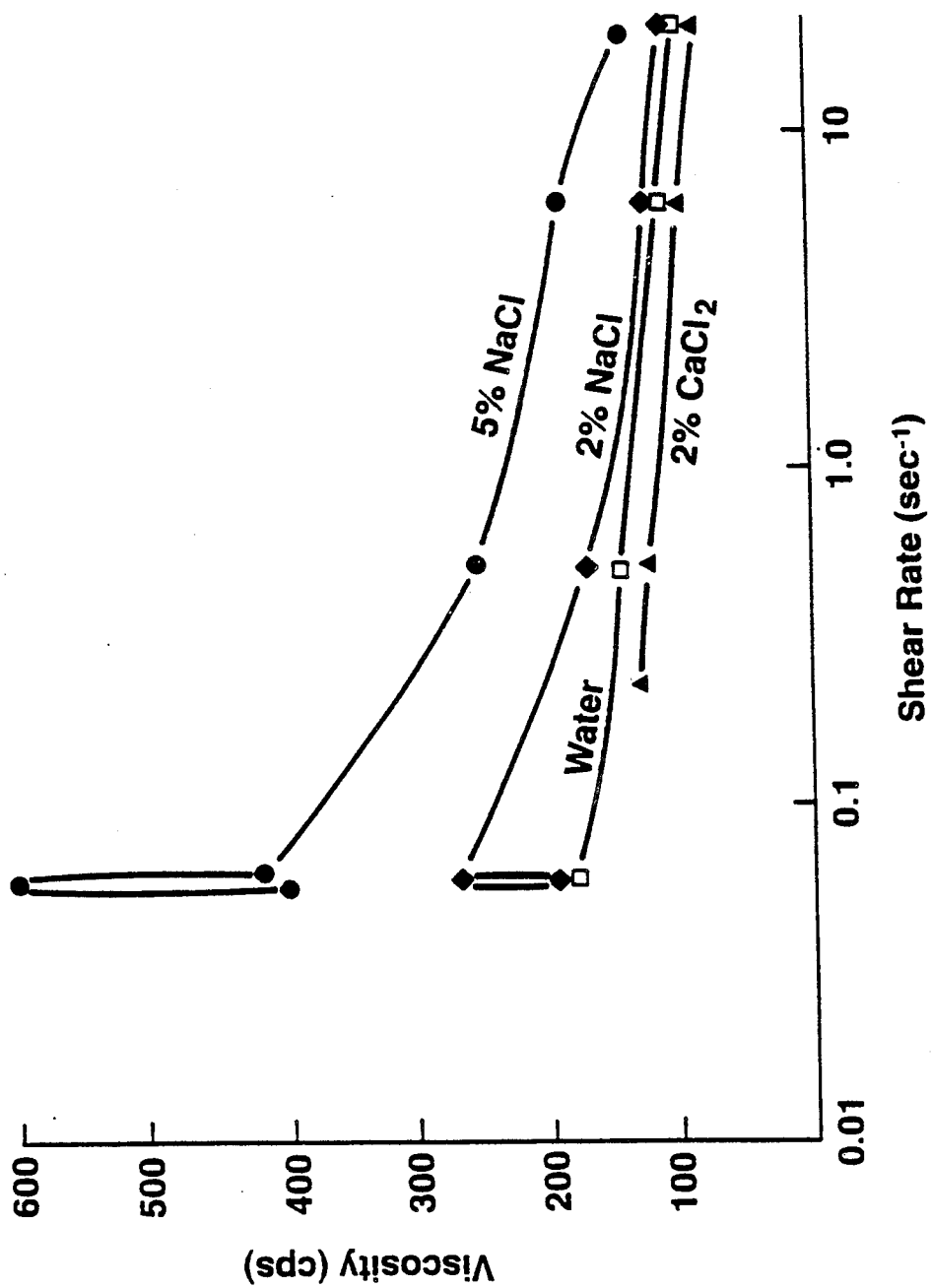

FIG. 3 shows the viscosity-shear rate data of the identical solution (FIG. 2) with the addition of salt, i.e. sodium chloride and calcium chloride. In all instances, very marked enhancement in the time dependencies of the rheological properties occurs with increasing salt levels. Again, in these instances, a viscosity increase followed by a slow decay is found. Furthermore, it is noted that the viscosity rose rapidly with salt concentration at all shear rates examined.

These specific rheological properties of these materials are anticipated to depend strongly on molecular weight, polymer concentration and, of course, brine concentration. That is, improved rheological properties would be found with increases in the above mentioned variables.

In summary, the synthesis and use of these novel copolymers (and novel cationic-alkyl containing monomers) to impart improved rheological properties to fresh water and brine solutions is desirable. The properties of the aqueous fluids containing these copolymers can be varied over a very broad range due to ability to readily change a number of structural parameters in the copolymer structure, i.e., level of cationic-alkyl containing monomer units, molecular weight, length of alkyl moiety (n) and the like.

It is anticipated these types of copolymers are useful as rheological control additives in a variety of drilling fluids, water treatment additives, well control and workover fluids, cutting fluids, completion fluids, antimisting additive, drag reducing agent and the like. Included in these applications are enhanced oil recovery, water based lubricants, water borne coating and membrane applications.

What is claimed is:

1. A homogeneous free radical copolymerization process for the formation of a copolymer of acrylamide and a cationic alkyl-containing monomer corresponding to the formula below which comprises the steps of:
   (a) forming a mixture derived from acrylamide monomer and the cationic monomer derived from an alkyl halide and dimethylamino propyl methylacrylamide under a nitrogen atmosphere;
   (b) adding deoxygenated water to said mixture to form a homogeneous reaction solution;
   (c) adding a free radical initiator to said homogeneous reaction solution to initiate polymerization of said cationic monomer derived from an alkyl halide and dimethylaminopropyl methylacrylamide; and
   (d) copolymerizing said acrylamide monomer and said cationic monomer derived from an alkyl halide and dimethylaminopropyl methylacrylamide at a sufficient temperature and for a sufficient period of time to form said copolymer of acrylamide/cationic monomer derived from an alkyl halide and dimethylaminopropyl methylacrylamide, which polymer is substantially free of particulates, said copolymer having the formula:

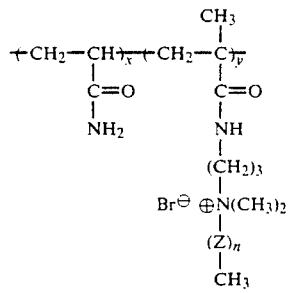

wherein n is 6 to 22, Z is a straight chained or branched alkyl or cycloalkyl group, x is about 90 to about 99.9 mole %, and y is about 0.1 to about 10 mole %.

2. A process according to claim 1 wherein said copolymer is water soluble.

3. A process according to claim 1 or 2 further including recovering said copolymer from said reaction solution.

4. A process according to claim 1 or 2 wherein the alkyl halide has an alkyl group selected from the group consisting of hexyl, octyl, decyl, dodecyl and hexadecyl groups.

5. A process according to claim 1 or 2 wherein said free radical initiator is selected from the group consisting of hydrogen peroxide; sodium thiosulfate, potassium persulfate and benzoylperoxide and alkylperoxide.

6. A process according to claim 1 or 2 wherein said polymerization is carried out at about 0° to about 70° C. for about 1 to about 48 hours.

* * * * *